United States Patent [19]

Kaneko

[11] Patent Number: 5,081,539
[45] Date of Patent: Jan. 14, 1992

[54] FACSIMILE APPARATUS AND FACSIMILE COMMUNICATION METHOD

[75] Inventor: Yohji Kaneko, Yamato, Japan

[73] Assignee: Canon Kabushiki Kaisha, Tokyo, Japan

[21] Appl. No.: 535,562

[22] Filed: Jun. 11, 1990

[30] Foreign Application Priority Data

Jul. 18, 1989 [JP] Japan .................................. 1-183613

[51] Int. Cl.$^5$ .............................................. H04N 1/32
[52] U.S. Cl. .................................................... 358/437
[58] Field of Search ............... 358/402, 403, 405, 407, 358/442, 447, 436, 437

[56] References Cited

U.S. PATENT DOCUMENTS

| | | | |
|---|---|---|---|
| 4,589,033 | 5/1986 | Burton et al. | 358/437 |
| 4,907,094 | 3/1990 | Mishima et al. | 358/437 |
| 4,930,017 | 5/1990 | Izawa | 358/437 |

Primary Examiner—Stephen Brinich
Attorney, Agent, or Firm—Fitzpatrick, Cella, Harper & Scinto

[57] ABSTRACT

In a facsimile apparatus bus-connected to an ISDN line, a D channel signal on a bus is monitored to supervise whether or not a reception interruption message from another facsimile apparatus is received. When a reception interruption message from another facsimile apparatus is detected, a communication restart procedure is executed for a destination apparatus of the reception interruption message, and interrupted facsimile communication data is substitute-received. Urgent document information or the like can be quickly transmitted to a destination without inadvertently interrupting facsimile communication. In this control, no large-capacity memory is required in each apparatus for substitute reception, and a simple and inexpensive facsimile apparatus can be provided.

10 Claims, 5 Drawing Sheets

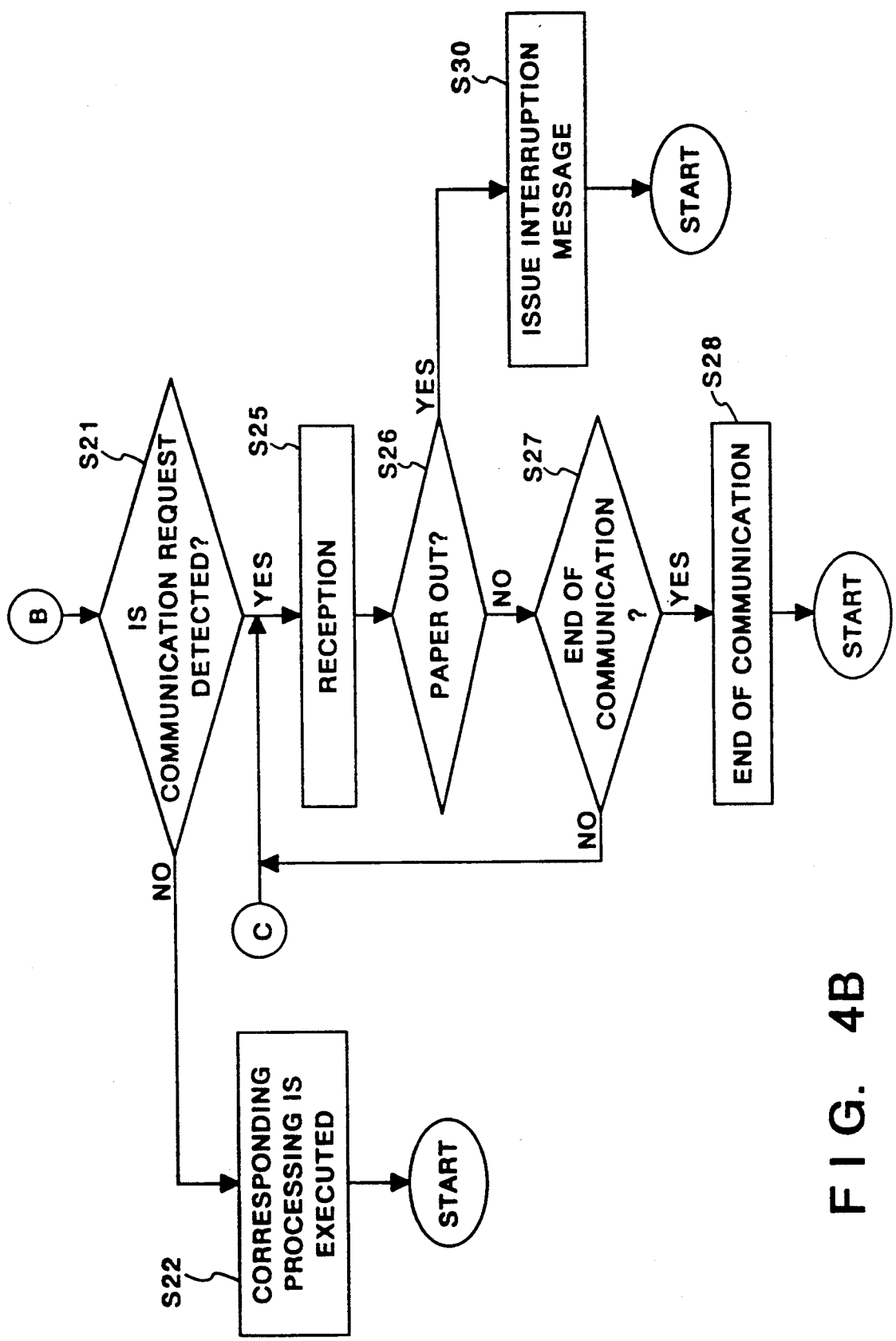
F I G. 4B

FACSIMILE APPARATUS AND FACSIMILE COMMUNICATION METHOD

BACKGROUND OF THE INVENTION

1. Field of the Invention

The present invention relates to a facsimile apparatus bus-connected to an ISDN line.

2. Description of the Prior Art

When receiving paper sheets are used up during reception, a conventional apparatus interrupts reception.

For this reason, in order to avoid interruption of reception, a large amount of receiving paper sheets are stocked in, e.g., a paper deck.

Alternatively, a conventional facsimile apparatus has a large-capacity delayed delivery or substitute-reception memory for substitute-receiving reception data so as not to interrupt reception even when receiving paper sheets are used up.

However, in the prior art described above, a mechanism for stocking a large amount of receiving paper sheets, e.g., a complex and large paper deck, is necessary, and requires extra cost. In addition, the overall apparatus becomes bulky.

In order to perform substitute reception when receiving paper sheets are used up, a large-capacity memory device for storing at least several tens to several hundreds of pages of images is required. When a 2-Mbyte capacity delayed delivery memory is prepared as a semiconductor memory, 16 1-Mbit DRAMs are required. Even with these DRAMs, when a slightly longer document is received, a storage capacity becomes full, and reception is interrupted. For this reason, a still larger capacity is necessary. Therefore, a 3.5" hard disk device must be arranged in addition to the above DRAMs to add a storage capacity of about 120 Mbytes.

However, these arrangements lead to an increase in cost on the current technical basis.

SUMMARY OF THE INVENTION

The present invention has been made in consideration of the above situation, and has as its object to provide a facsimile apparatus and a facsimile communication method, wherein even if one of facsimile apparatuses connected to an ISDN line can no longer continue reception, another facsimile apparatus connected to the ISDN line substitute-receives data in reception, so that neither a large-capacity memory nor a large-size paper deck are required, and facsimile communication will not be inadvertently interrupted.

As a means for achieving the above object, there is provided the following arrangement.

More specifically, a facsimile apparatus bus-connected to an ISDN line comprises a monitor unit for monitoring a D channel signal on a bus, a supervisor unit for supervising whether or not the monitor unit receives a reception interruption request from another facsimile apparatus connected to a D channel, and a substitute-reception unit for, when the supervisor unit detects the reception interruption message from the another facsimile apparatus, executing a communication restart procedure to a destination apparatus of the reception interruption message, and substitute-receiving interrupted facsimile communication data.

In the above arrangement, a network control function according to a D channel signal for bus-connecting a terminal to an ISDN line includes a monitor function of the D channel signal. Therefore, when an interruption message is issued from another terminal on the D channel signal control, substitute reception can be performed in place of the interrupted terminal, and urgent document information or the like can be quickly transmitted to a destination terminal without inadvertently interrupting facsimile communication. In this control, no large-capacity memory or the like for performing substitute reception need be arranged in each terminal, and, hence, a simple and inexpensive facsimile apparatus can be provided.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 4A to 4C are flow charts showing communication control of this embodiment.

DETAILED DESCRIPTION OF THE PREFERRED EMBODIMENT

An embodiment of the present invention will be described below with reference to the accompanying drawings.

Figure 1:
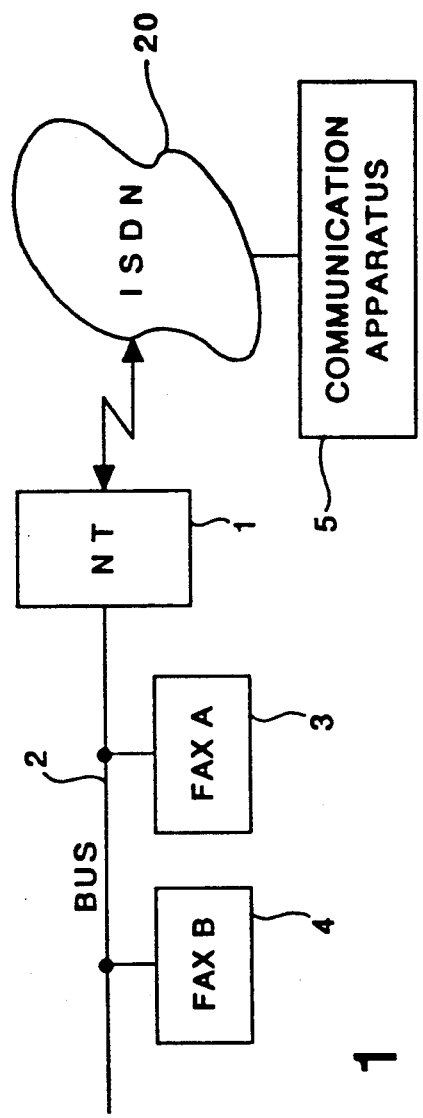
FIG. 1 is a block diagram showing a system arrangement of an embodiment according to the present invention.

FIG. 1 shows a system arrangement of a communication system to which a facsimile apparatus according to an embodiment of the present invention is connected. The apparatus of this embodiment is bus-connected to an ISDN line.

In FIG. 1, reference numeral 1 denotes an NT (Network Termination) provided on the side of an ISDN network 20; 2, a bus as a subscriber's line; 3, a bus-connected facsimile apparatus A (FAXA); and 4, another bus-connected facsimile apparatus B (FAXB). Reference numeral 5 denotes another communication apparatus connected to the ISDN network 20; and 20, the ISDN network.

Figure 2:
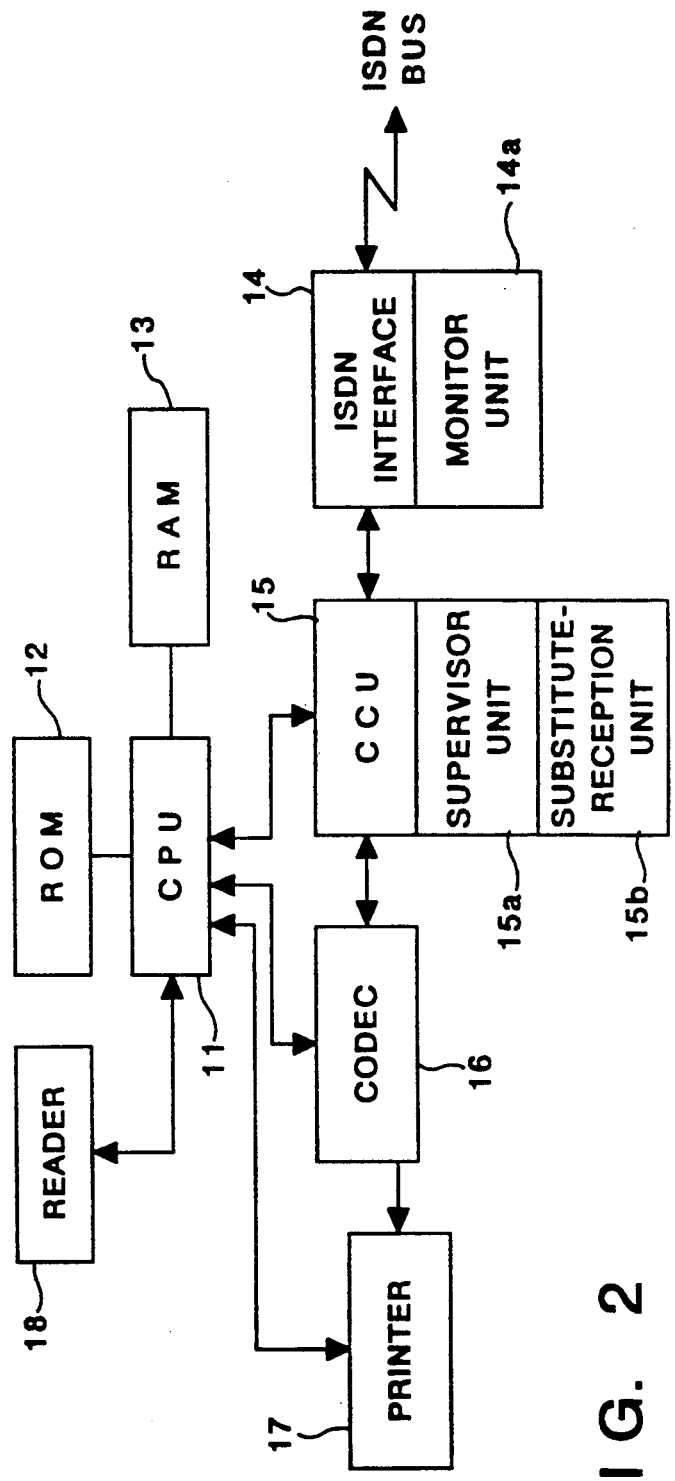
FIG. 2 is a detailed block diagram of a facsimile apparatus of this embodiment.

FIG. 2 is a detailed block diagram of the facsimile apparatus (FAXA 3 or FAXB 4) of this embodiment.

Figure 4A:
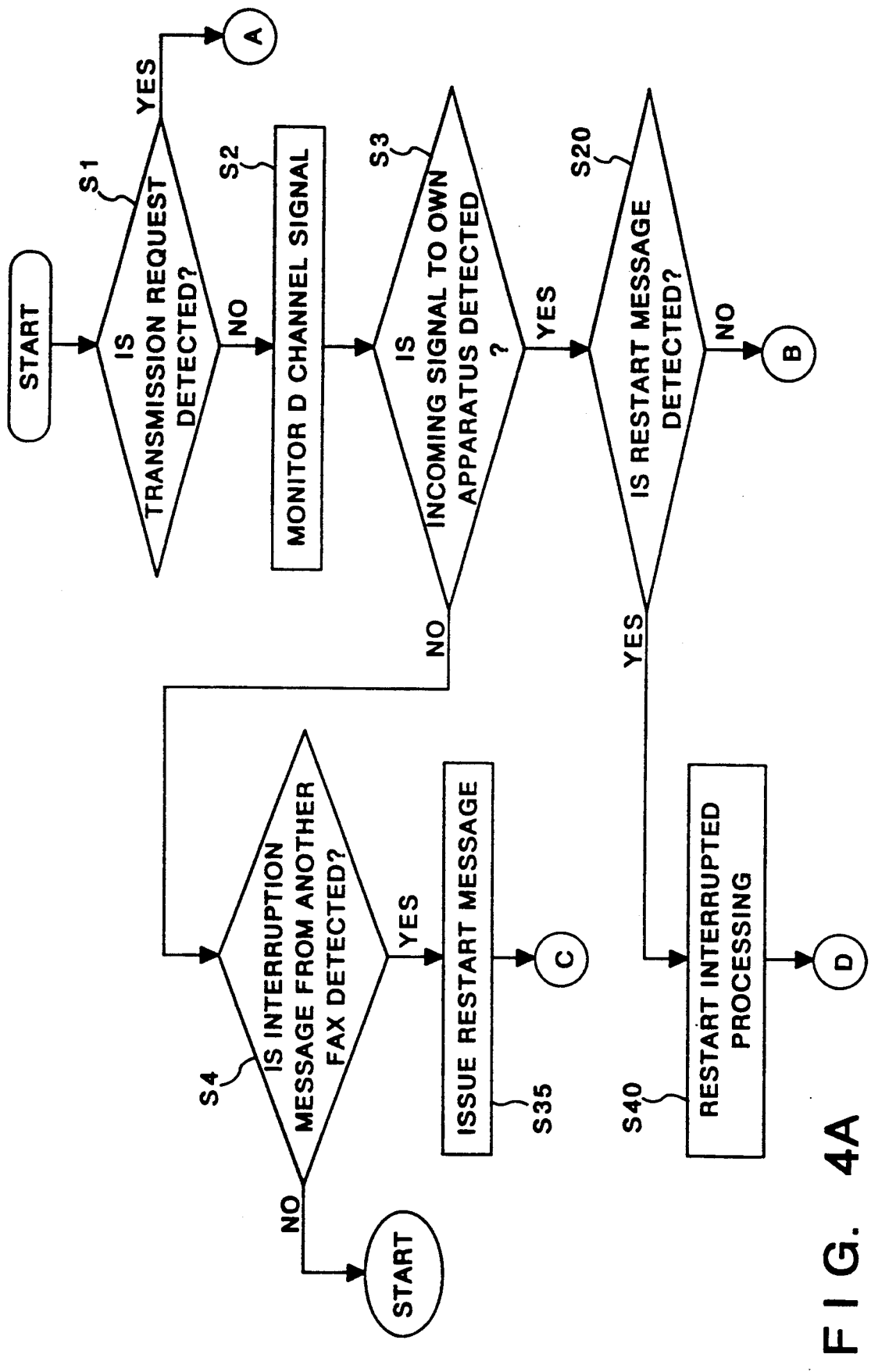
Figure 4C:
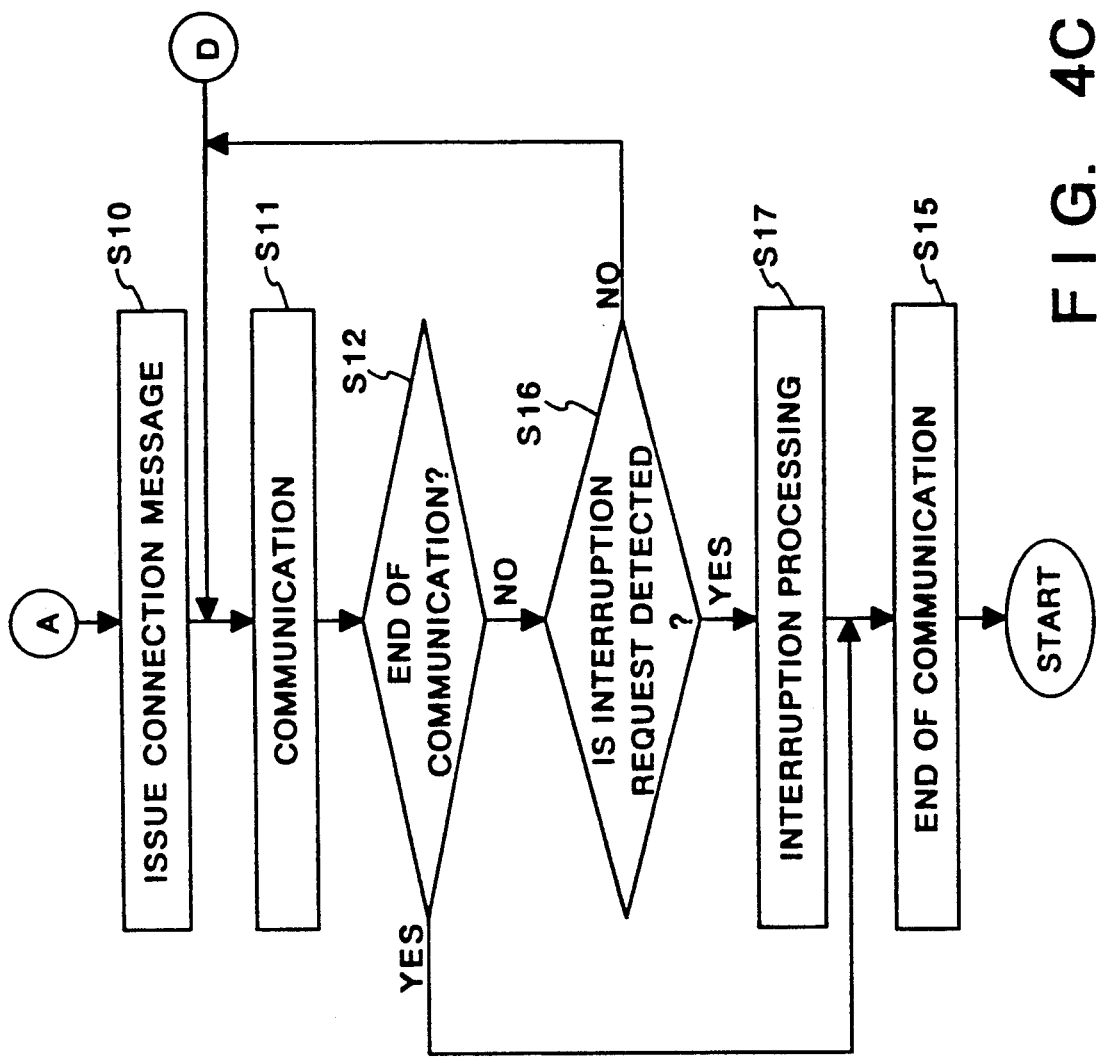

In FIG. 2, reference numeral 11 denotes a CPU for controlling the overall apparatus of this embodiment in accordance with a control sequence shown in, e.g., FIGS. 4A to 4C (to be described later) stored in a ROM 12; 12, the ROM for storing the program, and the like; 13, a RAM for temporarily storing document data to be transmitted, received data, and the like; and 14, an ISDN interface circuit for performing interface-control for connecting the apparatus to the ISDN network 20 through the bus 2. The interface circuit 14 comprises a monitor unit 14a for monitoring a D channel signal (to be described later). Reference numeral 15 denotes a CCU for performing communication control. For example, the CCU 15 performs D channel signal control with the interface circuit 14. The CCU 15 comprises a supervisor unit 15a for supervising a reception interruption message from another facsimile apparatus, and a substitute-reception unit 15b for, when the supervisor unit 15a detects the reception interruption message from the another facsimile apparatus, executing a communication restart procedure to a facsimile communication data output source apparatus as a destination of the reception interruption message, and substitute-receiving an interrupted facsimile document.

Reference numeral 16 denotes a CODEC for encoding/decoding a facsimile image to be transmitted/received into a facsimile code (MH, MR, MMR, or the like); 17, a printer for printing out reception data decoded into an image signal by the CODEC 16 or data read by a reader 18; and 18, the reader for reading image data to be transmitted.

Figure 3:
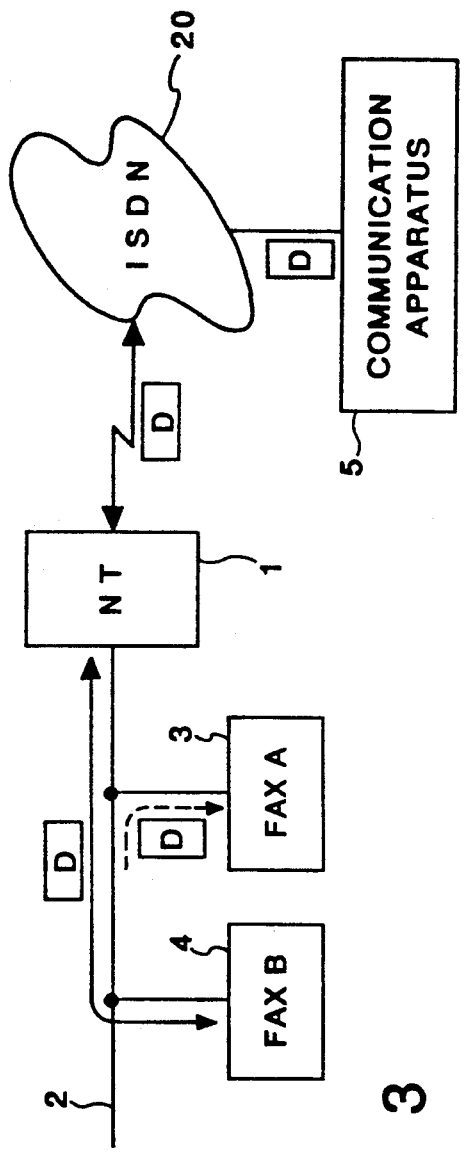
FIG. 3 is a diagram showing a flow of a D channel signal in the system of this embodiment.

FIG. 3 shows a flow of a D channel signal in the system of this embodiment with the above arrangement.

In FIG. 3, the FAX B 4 is in communication, and sends a D channel signal to the NT 1 through the bus 2 to perform data communication with another communication apparatus (e.g., the communication apparatus 5) connected to the ISDN network 20 through the NT 1.

At this time, the D channel signal flows on the bus 2, and also flows to the FAX A 3 connected to the bus 2.

For this reason, the monitor unit 14a of the ISDN interface circuit 14 of the FAX A 3 can always supervise signals flowing on the bus 2 to monitor the D channel signal. The supervisor unit 15a can supervise a reception interruption message using a monitor result of the monitor unit 14a.

Communication control of the apparatus of this embodiment with the above arrangement will be described below with reference to the flow charts shown in FIGS. 4A to 4C.

In step S1, the CPU 11 checks if a transmission original is set on the reader 18 of the own apparatus, and a transmission request to a desired destination apparatus is issued. If no transmission request is detected, the flow advances to step S2, the supervisor unit 15a of the CCU 15 reads out the monitor result of the D channel signal on the bus 2 by the monitor unit 14a. The CPU 11 checks in step S3 if an incoming signal addressed to its own apparatus is detected as a result of monitoring. If NO in step S3, the CPU 11 checks in step S4 if an interruption message from another apparatus connected to the bus 2 is detected. If NO in step S4, the flow returns to step S1, and the above-mentioned loop processing is repeated.

If YES in step S1, the flow advances from step S1 to step S10, and the CPU 11 instructs the CCU 15 and the ISDN interface circuit 14 to send a connection message to a desired destination apparatus (e.g., the communication apparatus 5). In step S11, the CPU 11 waits for a connection acknowledge message from the destination apparatus, and executes processing for, e.g., reading the transmission original on the reader 18. The CPU 11 causes the CODEC 16 to encode the read original data, and transmits the encoded data to the destination apparatus through the CCU 15 and the ISDN interface circuit 14. In step S12, the CPU 11 checks if communication is completed, e.g., transmission of all the originals on the reader 18 is completed. If YES in step S12, the flow advances to step S15, and communication processing is ended. The flow then returns to step S1.

However, if NO in step S12, the flow advances to step S16 to check if an interrupt request due to, e.g., a no-paper state of the destination apparatus is generated. If NO in step S16, the flow returns to step S11 to continue data communication. If YES in step S16, the CPU 11 executes interruption processing in step S17, and ends communication in step S15. The flow then returns to step S1.

If it is determined in step S3 that an incoming signal from a D channel is detected in the supervisor loop, the flow advances from step S3 to step S20 to check if the detected incoming signal is a restart message. If NO in step S20, the flow advances to step S21 to check if the detected signal is a communication request addressed to its own apparatus. If NO in step S21, the corresponding processing is executed in step S22, and the flow then returns to step S1.

If YES in step S21, the flow advances from step S21 to step S25, and a communication permission message is issued to start communication. The CPU 11 checks in step S26 if communication must be interrupted due to a no-paper state. If NO in step S26, the CPU 11 checks in step S27 if communication is completed. If NO in step S27, the flow returns to step S25 to continue data reception from an apparatus on the other end of the line. For example, if a receiver apparatus in this case is assumed to be the FAX B 4, in this communication state, the FAX B 4 is communicating with the network, receives image data sent from a transmitter apparatus through the ISDN interface 14 and the CCU 15, and decodes the received image data by the CODEC 16, and outputs the decoded data on the printer 17, as shown in a phase A in FIG. 5.

When communication from an apparatus on the other end of the line is completed, the flow advances from step S27 to step S28 to end communication, and the flow returns to step S1.

During communication in this manner, if a recording paper sheet of the printer 17 is used up and communication must be interrupted, the flow advances from step S26 to step S30, and the CPU 11 causes the CCU 15 to output an interruption message onto the network. The CPU 11 then interrupts processing, and the flow returns to step S1. A communication state in this case corresponds to a state shown in a phase B in FIG. 5. For example, the paper sheets in the FAX B 4 are used up, and the FAX B 4 issues an interruption message by means of the D channel signal. The apparatus on the other end of the line which received the interruption message performs the same interruption processing as in step S17.

Figure 5:
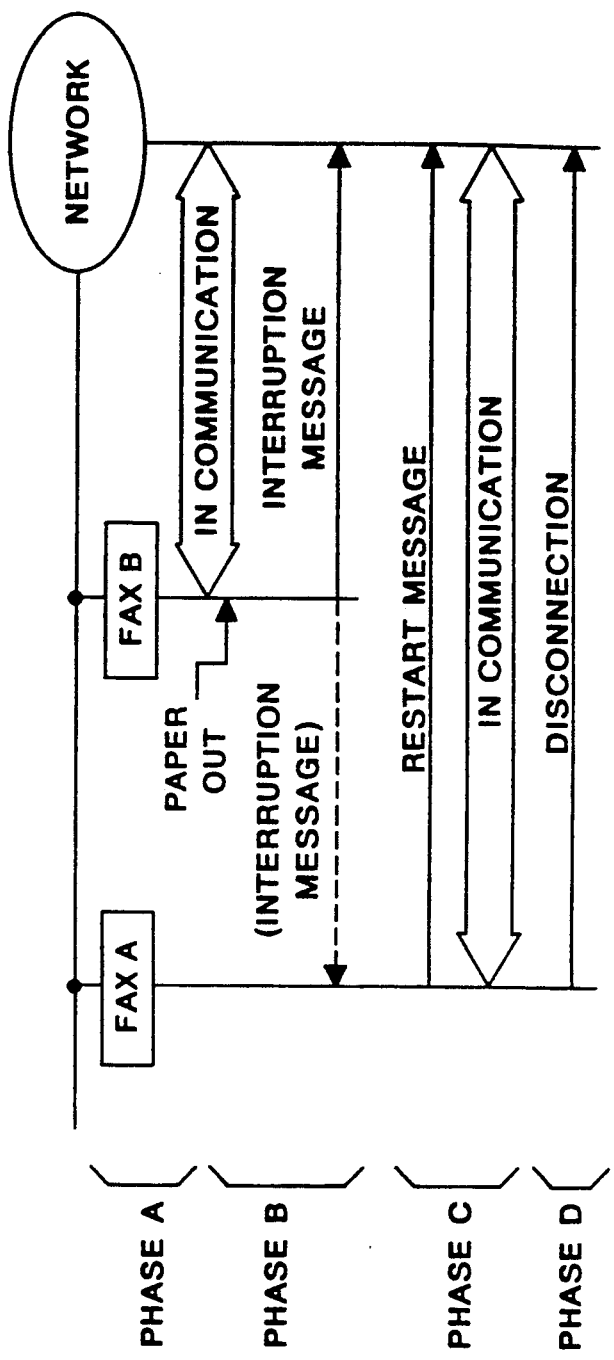
FIG. 5 is a chart showing a facsimile substitute-reception control sequence in the system of this embodiment.

Since the interruption message is output onto the bus 2, it flows to the FAX A 3, as indicated by a broken line in FIG. 5, as well as to the network side.

For this reason, the FAX A 3 can detect this signal. This is detection of the interruption message from another apparatus. When the supervisor unit 15a of the FAX A 3 detects this signal, the processing of the FAX A 3 advances from step S4 to step S35, and the CPU 11 instructs the substitute-reception unit 15b to issue a restart request to a transmitting apparatus with which the another apparatus has been communicating. The flow advances to step S25, and the CPU 11 performs substitute reception for the another apparatus (e.g., the FAX B 4), i.e., receives, in its own apparatus, data which is sent from the transmitting apparatus since it restarts the interrupted processing, and prints out the received data.

When the transmitting apparatus receives the restart message, the flow advances from step S20 to step S40, and the interrupted transmission processing of transmission data is restarted. The flow then advances to step S11, and interrupted data is transmitted to the apparatus which issued the restart request.

The series of states are indicated by a phase C in FIG. 5. In this case, the substitute-reception unit 15b of the CCU 15 and the ISDN interface circuit 14 issue a restart message onto the ISDN network by means of the D channel signal. The CPU then restarts a reception operation in place of the FAX B 4, causes the CODEC 16 to decode the received facsimile code data to an original image signal, and outputs it using the printer 17. Upon completion of processing, the CPU outputs a disconnection signal to complete communication processing, as indicated by a phase D in FIG. 5.

When substitute reception is executed in this manner, it is preferable to output a message indicating that substitute reception is performed to receive data addressed to another apparatus, and the name of another apparatus which should originally receive data.

According to this embodiment described above, when a facsimile apparatus in reception generates an interruption request and reception processing is interrupted, adjacent another apparatus on the same ISDN-connected bus can execute this reception processing for the apparatus which issued the interruption request, without arranging a special-purpose large-capacity delayed delivery memory in a facsimile apparatus.

For this reason, important transmission data can be prevented from being accidentally lost, and can be quickly output from an adjacent facsimile apparatus. Thus, an urgent document can be reliably transmitted to a destination apparatus.

The present invention is not limited to the above embodiment, and various changes and modifications may be made within the spirit and scope of the invention.

In the above description, two facsimile apparatuses are connected to the bus 2. However, according to another embodiment, three or more apparatuses may be connected to the bus 2 to obtain the same effect as described above as long as characteristics of the bus 2 permit.

In this case, installation positions of the apparatuses are registered, so that another apparatus closest to the interrupted apparatus may perform substitute reception.

Furthermore, substitute reception may be performed by only an apparatus within a predetermined distance range, and when an adjacent apparatus is separated from an interrupted apparatus by a distance exceeding the predetermined distance, substitute reception may be stopped.

As described above, substitute reception is performed by another facsimile apparatus, thus reducing cost per facsimile apparatus.

Bus connection as a feature of the ISDN network can be effectively utilized.

As described above, according to the present invention, when an interruption request is output from another terminal, substitute reception can be performed in place of the interrupted terminal, and urgent document information can be quickly transmitted to a destination apparatus without accidentally interrupting facsimile communication. In this control, a large-capacity memory for performing substitute reception need not be arranged in each apparatus, and a simple and inexpensive facsimile apparatus can be provided.

As many apparently widely different embodiments of the present invention can be made without departing from the spirit and scope thereof, it is to be understood that the invention is not limited to the specific embodiments thereof except as defined in the appended claims.

What is claimed is:

1. A facsimile apparatus connected to an Integrated Services Digital Network line with other communication terminals, said Integrated Services Digital Network line having a D channel for control information and a B channel for data, comprising:
    monitor means for monitoring a D channel signal on the Integrated Services Digital Network line;
    supervisor means for supervising whether or not said monitor means receives a reception interruption request from one of the other communication terminals connected to the D channel; and
    substitute-reception means for transmitting a signal for restarting data transmission which has been interrupted by the reception interruption request and receiving data substituting for the one of the other communication terminals, when said supervisor means detects the reception interruption request from one of the other communication terminals.

2. The facsimile apparatus according to claim 1, wherein when said supervisor means receives a communication request through the Integrated Services Digital Network line, said supervisor means receives facsimile communication data through the Integrated Services Digital Network line and prints out the received data.

3. The facsimile apparatus according to claim 2, further comprising interruption transmission means for transmitting the reception interruption request on the D channel, when said facsimile apparatus can no longer receive data during data reception.

4. The facsimile apparatus according to claim 1, further comprising transmission interruption means for, interrupting transmission processing, when the facsimile apparatus receives the reception interruption request through said Integrated Services Digital Network line, and communication restart means for restarting interrupted transmission, when the signal for restarting interrupted transmission is received during interruption of transmission by said transmission interruption means.

5. A facsimile communication method for a communication system in which at least two facsimile apparatuses are connected to an Integrated Services Digital Network line which has a D channel for control information and a B channel for data, comprising the steps of:
    when one of said two facsimile apparatuses receives facsimile communication data, another facsimile apparatus monitors the D channel signal on the Integrated Services Digital Network line, and when said one of the facsimile apparatuses transmits a reception interruption request in the D channel, said another facsimile apparatus transmits a signal for restarting data transmission which has been interrupted by the reception interruption request in the D channel and receives data substituting for said one facsimile apparatus.

6. A facsimile communication method according to claim 5, wherein said another facsimile apparatus receives data in accordance with a communication request, when the communication request is received during the monitoring of the D channel.

7. A facsimile communication method according to claim 6, wherein said another facsimile apparatus transmits the reception interruption message in the D channel when said one facsimile apparatus can no longer receive data during data reception.

8. The method according to claim 5, further comprising the steps of, when an own facsimile apparatus receives the reception interruption message from another ISDN-connected apparatus during facsimile communication with said another ISDN-connected apparatus, interrupting transmission processing, and the step of, when an interruption restart message is received from another facsimile apparatus during interruption of transmission, restarting interrupted facsimile communication, and transmitting remaining facsimile communication data to the facsimile apparatus which issued the interruption restart message.

9. A data communication apparatus connected to an Integrated Services Digital Network line with other communication terminals, said Integrated Services Digital Network line has a D channel for control information and a B channel for data, comprising:

monitor means for monitoring a D channel signal on the Integrated Services Digital Network line during data reception by one of the other communication terminals, and control means for detecting whether or not a reception interruption message is transmitted to the D channel by the other communication terminal, and transmitting a restart signal in accordance with a detection of the reception interruption message, wherein the restart signal restarts the data communication interrupted by one of the other communication terminals, said control means receives data substituting for the one of the other communication terminals.

10. A data communication apparatus according to claim 9, wherein said control means detects whether or not a communication request is received through the D channel, and receives data in accordance with a detection of the communication request.

* * * * *

UNITED STATES PATENT AND TRADEMARK OFFICE
CERTIFICATE OF CORRECTION

PATENT NO. : 5,081,539
DATED : January 14, 1992
INVENTOR(S) : YOHJI KANEKO

It is certified that error appears in the above-identified patent and that said Letters Patent is hereby corrected as shown below: Title page:

IN [56] REFERENCES CITED

Under U.S. PATENT DOCUMENTS, insert:

```
--4,717,967  1/1988   Yoshida ..........  358/296
  4,785,355  11/1988  Matsumoto .......  358/257
  4,789,900  12/1988  Takahashi .......  358/257--.
```

COLUMN 6

Line 35, "for," should read --for--.

COLUMN 7

Lines 3-15, Claim 8 should be deleted.

Signed and Sealed this

Nineteenth Day of October, 1993

Attest:

BRUCE LEHMAN

Attesting Officer

Commissioner of Patents and Trademarks